(12) United States Patent
Qi (10) Patent No.: US 12,250,640 B2
(45) Date of Patent: Mar. 11, 2025

(54) METHOD AND APPARATUS FOR PROVIDING A POSITIONING REFERENCE SIGNAL

(71) Applicant: Samsung Electronics Co., Ltd., Suwon-si (KR)

(72) Inventor: Yinan Qi, Staines (GB)

(*) Notice: Subject to any disclaimer, the term of this patent is extended or adjusted under 35 U.S.C. 154(b) by 443 days.

(21) Appl. No.: 17/310,588

(22) PCT Filed: Feb. 14, 2020

(86) PCT No.: PCT/KR2020/002147
§ 371 (c)(1),
(2) Date: Aug. 12, 2021

(87) PCT Pub. No.: WO2020/167052
PCT Pub. Date: Aug. 20, 2020

(65) Prior Publication Data
US 2022/0104140 A1    Mar. 31, 2022

(30) Foreign Application Priority Data
Feb. 15, 2019   (GB) ..................... 1902133

(51) Int. Cl.
*H04W 52/18* (2009.01)
*H04L 5/00* (2006.01)

(52) U.S. Cl.
CPC .......... *H04W 52/18* (2013.01); *H04L 5/0048* (2013.01)

(58) Field of Classification Search
CPC ..... H04B 17/26; H04B 17/318; H04L 5/0048; H04W 52/18; H04W 52/283; H04W 52/367
See application file for complete search history.

(56) References Cited

U.S. PATENT DOCUMENTS

| 10,498,508 B2 | 12/2019 | Liu et al. |
| 2013/0083729 A1 | 4/2013 | Xu et al. |

(Continued)

FOREIGN PATENT DOCUMENTS

| EP | 2693813 A1 | 2/2014 |
| EP | 2429244 B1 | 12/2014 |

(Continued)

OTHER PUBLICATIONS

Supplementary European Search Report dated Apr. 25, 2022, in connection with European Application No. 20755966.7, 11 pages.

(Continued)

*Primary Examiner* — Mansour Oveissi (57) ABSTRACT

A method, for a base station, for transmitting Position Reference Signals (PRS) in a wireless communication system is provided. The method comprises mapping PRS to Resource Elements (REs) of a frame structure, and transmitting the frame structure such that the power used to transmit REs containing PRS is higher than the power used to transmit REs not containing PRS. Methods, for a User Equipment (UE), for transmitting PRS in a wireless communication system are also provided. One method comprises measuring the signal strength from one or more base stations, and transmitting PRS with a power determined based on the measurements. Another method comprises receiving signaling from a base station, and transmitting PRS with a power determined based on the signaling.

10 Claims, 5 Drawing Sheets

(56) References Cited

U.S. PATENT DOCUMENTS

| | | | |
|---|---|---|---|
| 2013/0170454 A1* | 7/2013 | Zhou | H04W 28/086 370/329 |
| 2014/0016576 A1 | 1/2014 | Noh | |
| 2014/0219152 A1* | 8/2014 | Anto | H04W 52/244 370/311 |
| 2015/0092699 A1 | 4/2015 | Chen et al. | |
| 2016/0353440 A1 | 12/2016 | Lee et al. | |
| 2017/0078980 A1 | 3/2017 | Iwai et al. | |
| 2017/0264409 A1 | 9/2017 | Guo et al. | |
| 2017/0318554 A1 | 11/2017 | Kim | |
| 2019/0037351 A1 | 1/2019 | Prevatt | |
| 2019/0053071 A1 | 2/2019 | Ly | |
| 2020/0022167 A1* | 1/2020 | Manolakos | H04B 7/04 |
| 2022/0124636 A1* | 4/2022 | Kim | H04W 52/14 |

FOREIGN PATENT DOCUMENTS

| | | |
|---|---|---|
| KR | 10-2017-0042657 A | 4/2017 |
| WO | 2016155775 A1 | 10/2016 |
| WO | 2018126356 A1 | 7/2018 |
| WO | 2019032887 A1 | 2/2019 |
| WO | 2020166797 A1 | 8/2020 |

OTHER PUBLICATIONS

International Search Report and Written Opinion of the International Searching Authority dated May 22, 2020 in connection with International Application No. PCT/KR2020/002147, 12 pages.
Fraunhofer Iis, et al., "Aspects of UL-based NR positioning techniques," R1-1901183, 3GPP TSG RAN WG1 Ad-Hoc Meeting 1901, Taipei, Taiwan, Jan. 21-25, 2019, 8 pages.
Sony, "Considerations on Downlink based Positioning in NR," R1-1900384, 3GPP TSG RAN WG1 Ad-Hoc Meeting 1901, Taipei, Taiwan, Jan. 21-25, 2019, 9 pages.
Combined Search and Examination Report dated Jun. 26, 2020, in connection with United Kingdom Application No. GB1902133.6, 6 pages.
Search Report dated May 20, 2021, in connection with United Kingdom Application No. GB1902133.6, 5 pages.
Combined Search and Examination Report dated Oct. 8, 2021, in connection with United Kingdom Application No. GB2108748.1, 7 pages.
Asustek, "Power control on SRS for beam management," R1-1720903, 3GPP TSG RAN WG1 Meeting 91, Reno, USA, Nov. 27-Dec. 1, 2017, 4 pages.
Ericsson, "Downlink Positioning Solutions: design and evaluations," R1-1901195, 3GPP TSG RAN Ad-Hoc Meeting 1901, Taipei, Taiwan, Jan. 21-25, 2019, 22 pages.
Communication pursuant to Article 94(3) EPC dated Feb. 22, 2024, in connection with European Application No. 20755966.7, 7 pages.

* cited by examiner

METHOD AND APPARATUS FOR PROVIDING A POSITIONING REFERENCE SIGNAL

CROSS-REFERENCE TO RELATED APPLICATIONS

This application is a 371 National Stage of International Application No. PCT/KR2020/002147, filed Feb. 14, 2020, which claims priority to United Kingdom Patent Application No. 1902133.6, filed Feb. 15, 2019, the disclosures of which are herein incorporated by reference in their entirety.

BACKGROUND

1. Field

The present application relates generally to wireless communication systems, more specifically, the present disclosure relates to methods, apparatus and systems for providing a Positioning Reference Signal (PRS) for allowing the position of a User Equipment (UE) to be determined in a wireless communication system. For example, certain examples of the present disclosure provide methods, apparatus and systems for providing PRS in 3rd Generation Partnership Project (3GPP) 5th Generation (5G) New Radio (NR).

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The present disclosure relates to methods, apparatus and systems for providing a Positioning Reference Signal (PRS) for allowing the position of a User Equipment (UE) to be determined in a wireless communication system.

In one embodiment, a method for a base station, for transmitting Position Reference Signals (PRS) in a wireless communication system is provided. The method may include mapping PRS to Resource Elements (REs) of a frame structure, and transmitting the frame structure such that the power used to transmit REs containing PRS is higher than the power used to transmit REs not containing PRS.

In one embodiment, the frame structure may include two or more multi-carrier symbols and each RE comprises a sub-carrier of a symbol. The step of mapping may include mapping PRS to a subset of REs of each symbol such that the number of REs containing PRS is a fraction 1/k of the total number of REs in each symbol. The power used to transmit REs containing PRS may be a factor k higher than a reference power.

In one embodiment, PRS may be mapped to REs according to a comb-k pattern at the sub-carrier level and the power used to transmit REs containing PRS may be boosted by a factor of k. Or PRS may be mapped to REs according to a comb-k pattern at the sub-carrier level and a comb-m pattern at the Resource Block (RB) level and the power used to transmit REs containing PRS may be boosted by a factor of k*m.

In one embodiment, zero power may be used to transmit REs not containing PRS.

In one embodiment, the power used to transmit REs containing PRS may be selected so as to not exceed a certain power threshold.

In one embodiment, REs containing PRS may be transmitted with full transmission power, which could be subject to some constraints, e.g., the total transmission power of each symbol keeps the same.

In one embodiment, PRS may be mapped to a first set of REs in a first spatial layer. A second set of REs in a second spatial layer, corresponding to the first set of REs, may be used to boost the transmission power of the first set of Res. In addition, data and/or control signals may be mapped a third set of REs of the second layer, where the third set of REs do not include REs of the second set of REs. The step of transmitting the frame structure may include transmitting the first and second layers in the same or respective transmission beams.

In one embodiment, the PRS may include PRS of 5G NR.

In another embodiment, a method for a user equipment (UE), for transmitting Position Reference Signals (PRS) in a wireless communication system is provided. The method may include measuring the signal strength from one or more base stations and transmitting PRS with a power determined based on the measurements.

In one embodiment, the step of measuring may include measuring the signal strength from two or more base stations.

In one embodiment, the method may further include identifying the weakest link, wherein the step of transmitting comprises transmitting the PRS based on the weakest link.

In one embodiment, the method may further include identifying the average link quality, wherein the step of transmitting may include transmitting the PRS based on the average link quality.

In one embodiment, the PRS may be transmitted so as to not exceed a maximum allowed transmit power per carrier.

In one embodiment, the step of measuring may include measuring the signal strength of a serving base station. In addition, the step of transmitting may include transmitting the PRS with a power determined based on the measurement with an offset.

In one embodiment, the offset may be a pre-defined offset or a configurable offset.

In one embodiment, the step of transmitting may include transmitting with full power.

In another embodiment, a method for a user equipment (UE), for transmitting Position Reference Signals (PRS) in a wireless communication system is provided. The method may include receiving signaling from a base station, and transmitting PRS with a power determined based on the signaling.

In one embodiment, the signaling may include an indication to transmit with full power, which could be subject to some constraints, e.g., the total transmission power of each symbol keeps the same.

In one embodiment, the signaling may include an offset determined based on measurements of Uplink (UL) reference signals, wherein the PRS is transmitted with a power based on the offset.

In one embodiment, the method may further include receiving multiple Transmission Power Control (TPC) signals, wherein the step of transmitting may include adjust the transmission power based on the received TPC signals.

In one embodiment, the method may further include receiving Transmission Power Control (TPC) signals, and when identifying that the Uplink (UL) PRS will be used for positioning, scaling the transmission power configured by the serving cell by K times.

In one embodiment, the method may further include exchanging Transmission Power Control (TPC) signals among gNBs via X2 interface.

In another embodiment, a base station (BS) in a wireless communication network is provided. The BS may include a transceiver and at least one processor operably connected to the transceiver. The at least one processor may be configured to map PRS to Resource Elements (REs) of a frame structure and transmit the frame structure such that the power used to transmit REs containing PRS is higher than the power used to transmit REs not containing PRS.

In another embodiment, a user equipment (UE) in a wireless communication network is provided. The UE may include a transceiver and at least one processor operably connected to the transceiver. The at least one processor may be configured to measure the signal strength from one or more base stations and transmit PRS with a power determined based on the measurements.

In another embodiment, the at least one processor of the UE may receive signaling from a base station, and transmit PRS with a power determined based on the signaling.

Other technical features may be readily apparent to one skilled in the art from the following figures, descriptions, and claims.

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

The terms and words used herein are not limited to the bibliographical or standard meanings, but, are merely used to enable a clear and consistent understanding of the invention.

Throughout the description and claims of this specification, the words "comprise", "include" and "contain" and variations of the words, for example "comprising" and "comprises", means "including but not limited to", and is not intended to (and does not) exclude other features, elements, components, integers, steps, processes, operations, functions, characteristics, properties and/or groups thereof. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication.

Throughout the description and claims of this specification, the singular form, for example "a", "an" and "the", encompasses the plural unless the context otherwise requires. For example, reference to "an object" includes reference to one or more of such objects.

Throughout the description and claims of this specification, language in the general form of "X for Y" (where Y is some action, process, operation, function, activity or step and X is some means for carrying out that action, process, operation, function, activity or step) encompasses means X adapted, configured or arranged specifically, but not necessarily exclusively, to do Y.

Features, elements, components, integers, steps, processes, operations, functions, characteristics, properties and/or groups thereof described or disclosed in conjunction with a particular aspect, embodiment, example or claim of the present invention are to be understood to be applicable to any other aspect, embodiment, example or claim described herein unless incompatible therewith. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "processor" or "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this disclosure. Those of ordinary skill in the art should understand that in many if not most instances, such definitions apply to prior as well as future uses of such defined words and phrases.

Certain examples of the present disclosure provide methods, apparatus and systems for providing Positioning Reference Signals (PRS) for allowing the position of a User Equipment (UE) to be determined in a wireless communication system. For example, certain examples of the present disclosure provide methods, apparatus and systems for providing PRS in 3GPP 5G-NR. However, the skilled person will appreciate that the present invention is not limited to these examples, and may be applied in any suitable system or standard, for example one or more existing and/or future generation wireless communication systems or standards.

LTE positioning has been discussed in Release-9 and Release-11. In Release-15 LTE, some Radio Access Technology (RAT)-dependent positioning techniques were agreed. NR-positioning mechanism is a study item in current RAN1 Release-16 agenda. Observed Time Difference of Arrival (OTDOA) has been identified as a method for achieving positioning for both Downlink (DL) and Uplink (UL).

In wireless communication systems, it is often useful to be able to determine the position of a user equipment (UE), for example to provide location-based services and emergency call positioning.

One example of a positioning method is Observed Time Difference Of Arrival (OTDOA). This technique is used, for example, in the 3rd Generation Partnership Project (3GPP) Long-Term Evolution (LTE) standard (e.g. as specified in Release-8, Release-9 and subsequent documents). In this technique, a UE measures the Time Of Arrival (TOA) of signals received from multiple base stations (eNBs) and the position of the UE is determined based on these measurements, as well as the known positions of the base stations, using geometry.

Although the OTDOA technique may, in principle, be performed based on any Downlink (DL) signals (e.g. synchronization signals), in practice specific positioning signals are sometimes used, for example to improve performance. For example, in the LTE standard, Positioning Reference Signals (PRS) were introduced in Release-9. The PRS signals of LTE comprise pseudo-random sequences that are mapped to certain Resource Elements (REs) (e.g. REs that are not allocated to Physical Broadcast Channel (PBCH)). The UE may correlate the received PRS sequences with local copies of the sequences and determine the corresponding ranges (distances) to the base stations based on the positions of the correlation peaks.

The 3GPP 5th Generation (5G) standard is a new standard currently under development and intended to succeed 4G (including LTE) and earlier systems. 5G New Radio (NR) is an air interface developed by 3GPP for the 5G mobile network. NR UE-positioning mechanism is a study item in the current RAN1 (Radio Layer 1) Release-16 agenda, and is seen as a main area to be completed for 5G-NR to be compliant with Enhanced 9-1-1 (E911) and other emergency services requirements.

What is required is a positioning mechanism suitable for use in 5G-NR. For example, a technique using PRS with enhanced performance for 5G-NR requirements is desirable.

The above information is presented as background information only to assist with an understanding of the present disclosure. No determination has been made, and no assertion is made, as to whether any of the above might be applicable as prior art with regard to the present invention.

In 3GPP TSG RAN WG1 Meeting Ad-Hoc Meeting 1901, Taipei, Taiwan, 21-25 Jan. 2019, RAN1 Chairman's Notes, Section 7.2.10, "Study on NR positioning support", the following agreements have been made:

Agreement:
NR DL PRS design for FR1 and FR2 supports:
. . .
Dedicated NR DL PRS resources—time-frequency grid at resource block level
  PRS transmitted in one cell may or may not collide with PRS transmissions in other cell
    e.g. frequency vShift/comb-offset is the same or different for two different PRSs in the same RB
  There is no data/control transmission in time-frequency grid of dedicated NR-DL PRS resources
  FDM multiplexing with other signals at RE level inside of PRS time-frequency grid is precluded
  FFS interference randomization techniques across PRS signals
FFS shared in time/frequency NR DL PRS resources with other transmissions including data/control
  FFS which physical channel/signals can share resources with NR DL PRS
  FFS interference randomization techniques for PRS transmission with other signals Agreement:
FFS: At least the following aspects for NR UL PRS design
Use of UL beam sweeping at FR2
  Beam sweeping includes possibility of quasi-omni transmission
Use of UL beam alignment at FR2 through DL reception and beam correspondence
UL Power control aspects
UL timing advance aspects FR1 refers to Frequency Range 1 (i.e. 450 MHz-600 MHz) and FR2 refers to Frequency Range 2 (i.e. 24.25 GHz-52.6 GHz). FDM refers to Frequency Division Multiplexing. FFS refers to For Further Study.

In 3GPP Release-16 a Study Item Description (SID)/Work Item Description (WID) on NR positioning is approved. In particular, in RP-181399; 3GPP TSG RAN Meeting #80, La Jolla, USA, Jun. 11-14, 2018, "New SID: Study on NR positioning support", the objectives of this WID are as follows.
. . .
Study and evaluate potential solutions of positioning technologies based on the above identified requirements, evaluation scenarios/methodologies [RAN1]
  The solutions should include at least NR-based RAT dependent positioning to operate in both FR1 and FR2 whereas other positioning technologies are not precluded.
  Minimum bandwidth target (e.g. 5 MHz) of NR with scalability is supported towards general extension for any applications.
Study of positioning architecture for location services, functional interfaces, protocol, and procedures for supporting NR dependent positioning technologies (if needed; otherwise, need to be confirmed) [RAN2, RAN3]
  Rel-15 NR positioning architecture/protocol is a starting point of the discussion while the Release 16 LCS architecture enhancement study in TSG SA side is taken into account.
  Common architecture with IoT and hybrid positioning.
  The positioning architectures should support standalone NR for both voice and data including IoT service.
  IoT use cases, including potential LPP evolution, and efficient/low-complexity signaling are considered while striving for a common architecture.
  End-to-end latency is considered to developing positioning architecture.

IoT refers to Internet of Things. TSG SA refers to Technical Specification Group Service and System Aspects. LPP refers to LTE Positioning Protocol. LCS refers to Location Services.

It is likely that the PRS specified in LTE (from Release 9 onwards) will be adapted as a means to support OTDOA techniques in 5G-NR.

In view of the above agreements and objectives, certain examples of the present disclosure provide one or more techniques for power boosting and power control for NR positioning signals. The skilled person will appreciate that the techniques disclosed herein are not limited to NR or LTE. For example, the techniques disclosed herein may be used to apply power boosting and power control for positioning signals other than PRS of NR or LTE.

In the following, a power boosting technique for Downlink (DL) PRS, and a power control technique for Uplink (UL) PRS are described.

Downlink Power Boosting

Figure 1:
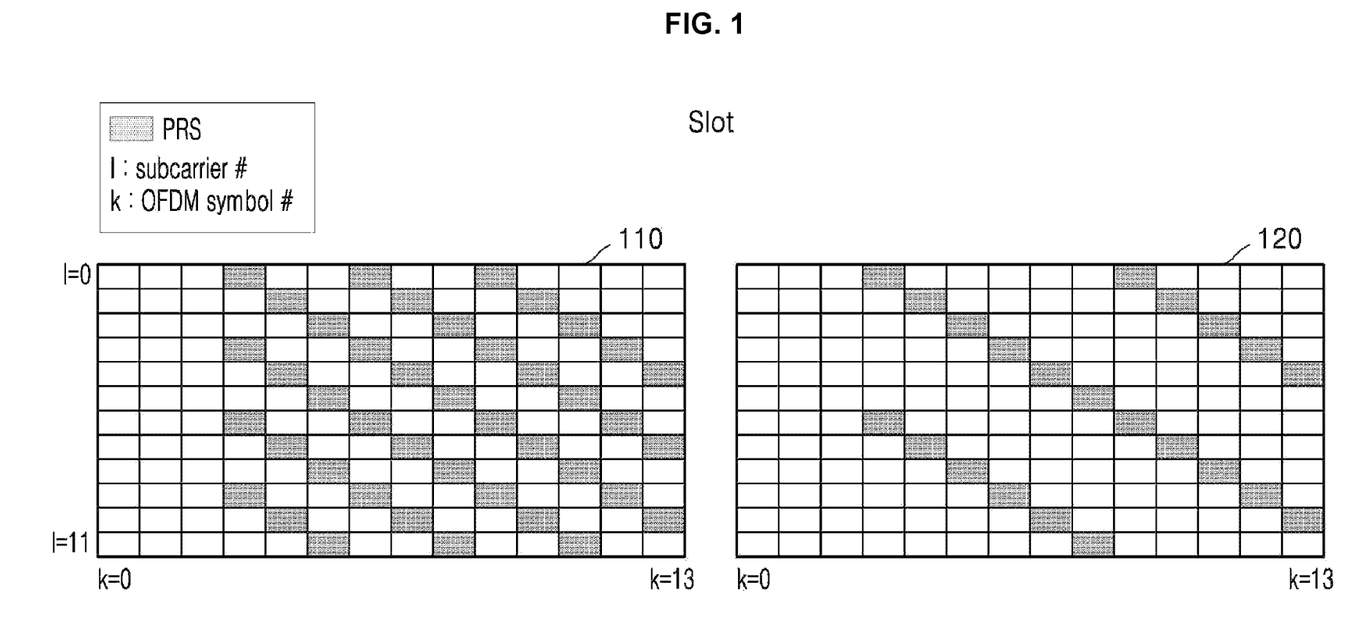
FIG. 1 illustrates exemplary PRS (positioning reference signal) mapping patterns according to embodiments of the present disclosure.

FIG. 1 illustrates exemplary PRS (positioning reference signal) mapping patterns according to embodiments of the present disclosure. As shown in FIG. 1, for DL, PRS may be mapped to Resource Elements (REs) of a frame structure according to any suitable mapping scheme. FIG. 1 illustrates exemplary PRS mapping patterns.

Figure 2:
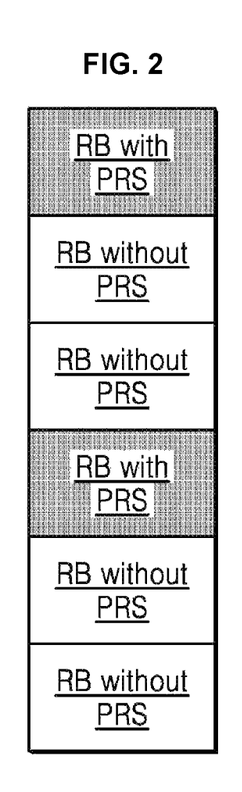
FIG. 2 illustrates a mapping pattern at the Resource Block (RB) level according to embodiments of the present disclosure.

FIG. 1 illustrates mapping patterns at the subcarrier level while FIG. 2 illustrates a mapping pattern at the Resource Block (RB) level.

The frame structure may be used for certain DL Physical Layer channels, for example a Physical Downlink Shared Channel (PDSCH) and a Physical Downlink Control Channel (PDCCH) for transmitting information (e.g. control signals and data) from a base station (e.g. gNB) to one or more mobile devices (e.g. UEs).

The frame may include a number of Orthogonal Frequency Division Multiplexing (OFDM) symbols, each OFDM symbol comprising a number of subcarriers (or Component Carriers (CCs)). Each subcarrier of each symbol may be referred to as a Resource Element (RE). The symbols may be thought of as forming a grid of REs with time along one axis of the grid (the horizontal axis in FIG. 1) and frequency along the other axis of the grid (the vertical axis in FIG. 1). A block of REs comprising a number (e.g. 12) of adjacent subcarriers may be defined as a Physical Resource Block (PRB). The frame may be divided into a number of consecutive symbols forming the PDCCH and a number of consecutive symbols forming the PDSCH.

One type of mapping scheme may be comb-k pattern, in which PRS are mapped to every k-th subcarrier of each symbol or RB, and in which the subcarrier indices to which PRS are mapped cyclically decrements (or increments) with increasing symbol index. FIG. 1 illustrates comb-3 pattern (110) and comb-6 pattern (120). The skilled person will appreciate that other mapping schemes may be used.

FIG. 2 illustrates a mapping pattern at the Resource Block (RB) level according to embodiments of the present disclosure.

As shown in FIG. 2, for DL, PRS may be mapped to Resource Elements (REs) of a frame structure according to any suitable mapping scheme. FIG. 2 illustrates exemplary PRS mapping patterns. FIG. 2 illustrates a mapping pattern at the Resource Block (RB) level.

In some examples, a mapping scheme at the RB level may be used. For example, according to a comb-m pattern at the RB level, every m-th RB may include PRS while other RBs may not include PRS. FIG. 2 illustrates a comb-3 pattern at the RB level. The skilled person will appreciate that any other suitable schemes at the RB level may be used.

In some examples, PRS may be mapped to only a subset of symbols. For example, the symbols to which PRS are mapped may be symbols to which PDSCH is allocated. PRS may not be mapped to symbols to which PDCCH is allocated. For example, in FIG. 1, PRS may be mapped to symbols with indices 0-2 (to which PDCCH is allocated), but PRS may be mapped to symbols with indices 3-13 (to which PDSCH is allocated).

A certain total power may be used to transmit a symbol, and a certain proportion of this total power (per-carrier/RE power) may be used to transmit each RE/carrier in the symbol. For example, when the power boosting techniques described herein are not used, the power used to transmit each RE (per-carrier/RE power) may be the total power for transmitting a symbol divided by the total number of carriers (activated or not) in the symbol. In some systems, the average power may not vary across subcarriers. The per-carrier/RE power, for example determined in the manner described above, when the power boosting techniques described herein are not used may be regarded as a normal power or reference power.

According to certain examples of the present disclosure, the power of the REs not occupied by PRS can be used to boosting the power of PRS (i.e. relative to the normal/reference power). For example, the power allocated to one or more or all REs occupied by PRS may be increased (i.e. relative to the normal/reference power), while the power allocated to one or more or all REs not occupied by PRS may be decreased (i.e. relative to the normal/reference power).

In some examples, the amount of power allocated to different REs occupied by PRS may be the same or may be different. In some examples, the increase in power (i.e. the power boosting level or factor) applied to different REs occupied by PRS may be the same or may be different.

In certain examples, one or more power boosting rules may be applied. For example, for a comb-k pattern, the power of PRS REs may be boosted by k times (i.e. relative to the normal/reference power). In this case, REs not containing PRS may be transmitted with zero power.

In certain examples, the comb pattern may take both subcarrier level comb pattern (see FIG. 1) and RB level comb pattern (see FIG. 2) into account. For example, for a comb-k subcarrier pattern and a comb-m RB pattern, the power of PRS may be boosted by k*m times (i.e. relative to the normal/reference level).

In some examples, one or more constraints may be applied to the power boosting. For example, if symbols are transmitted with a fixed overall power, then the power boosting applied to PRS REs (and power reduction applied to non-PRS REs) in a symbol should be controlled so as to maintain the overall fixed transmission power. The skilled person will appreciate that a reduction in power applied to non-PRS REs allows a corresponding increase in power applied to PRS REs while maintaining an overall transmission power at or below a certain threshold.

The PRS with boosted power can improve the hearability of the UE. However, in some examples the power boosting may need to be subject to a limit, for example imposed by hardware. In this case, a cap may need to be imposed on the power boosting (i.e. a power cap for individual REs containing PRS). For example, the power of PRS may be chosen as min{Pboost, Pcap}, where Pboost is the normal boosting power and Pcap is a power cap (i.e. a threshold, which may be predetermined or dynamically configurable for example).

In some examples PRS may be always transmitted with full transmission power (e.g. maximum available power) without taking the PRS mapping scheme (e.g. comb pattern) into consideration. For example, even if a comb-k pattern is applied to PRS mapping, the PRS may be boosted (i.e. the transmission power may be increased) so as to be transmitted with full transmission power rather than being boosted by k times.

In some examples, PRS may be mapped to REs according to a certain pattern in the time-frequency domain. In other examples, PRS may be mapped to REs according to a certain pattern additionally in the spatial domain as described in the following.

Some systems may apply spatial multiplexing techniques, for example Multi User (MU)-Multiple-Input-Multiple-Output (MIMO). Such spatial multiplexing techniques may be used to enable transmissions to multiple physically separate devices or other entities using the same time and frequency resources. For example, this may be achieved by using beamforming techniques to generate a relatively narrow transmission beam for transmission to a particular device. Different beams may be generated for different devices. If the beams are directed in different directions then there may be relatively low interference between the beams, even if the same time and/or frequency resources are used in each beam. A beam may also be referred to as a layer.

When PRS and data/control are spatial multiplexed, e.g. in an MU-MIMO manner, some transmission layers/beams can be used for PRS and other transmission layers/beams can be used for data/control. If the multiplexing is orthogonal in the time/frequency domain, the energy of data/control layer can be used to further boost PRS. The PRS can be further boosted based on the number of layers.

Figure 3:
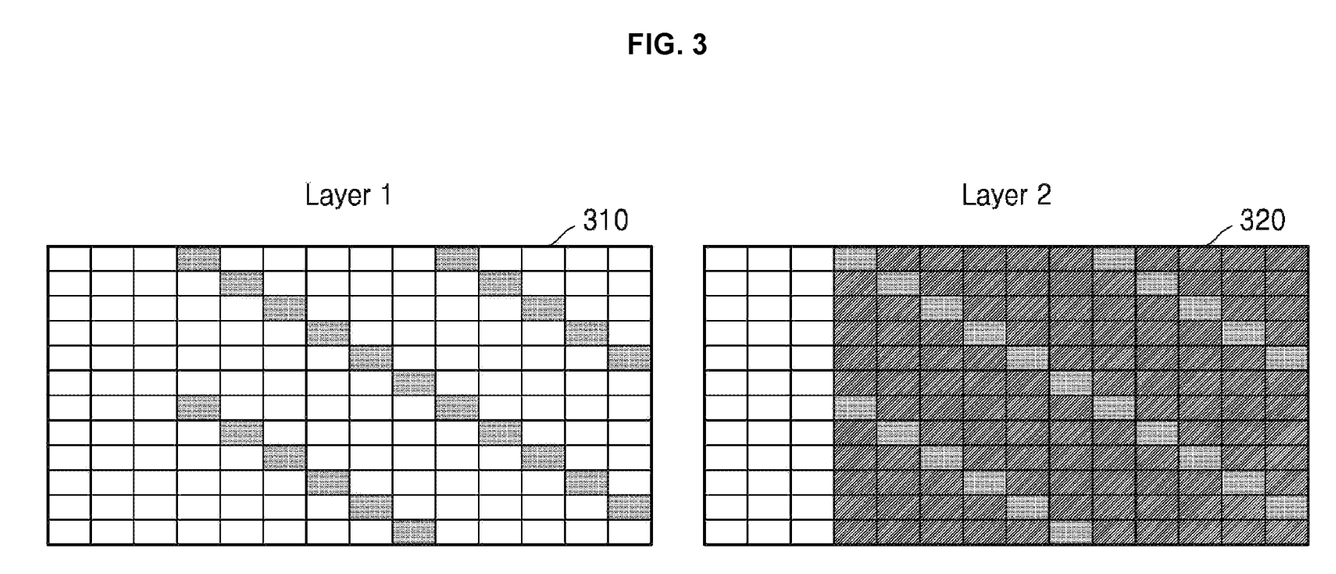
FIG. 3 illustrates exemplary PRS mapping patterns in the case that PRS and data/control signals are spatially multiplexed according to embodiments of the present disclosure.

FIG. 3 illustrates exemplary PRS mapping patterns in the case that PRS and data/control signals are spatially multiplexed according to embodiments of the present disclosure.

As shown in FIG. 3, there may be two transmission layers/beams in this example, although the skilled person would appreciate that any suitable number of layers may be provided. As shown in FIG. 3, in the first layer (310), PRS may be mapped to REs according to a comb-k pattern (in this example a comb-6 pattern) in a similar manner with the comb-6 pattern (120) illustrated in FIG. 1. The skilled person will appreciate that other mapping patterns may be applied. As shown in FIG. 3, in the second layer (320), data/control signals may be mapped to REs indicated by the dark shaded portion. In the second layer (320), data/control signals may be not mapped to REs corresponding to (i.e. having the same time and frequency indices as) REs in the first layer (310) to which PRS are mapped. Rather, these REs may be used to boost the PRS in the first layer (310). In particular, the power used to transmit REs in the first layer containing PRS may be further boosted (i.e. increased), while the power used to transmit corresponding REs in the second layer (320) may be reduced (for example to zero power).

In the example of FIG. 3, the PRS in the first layer can be boosted by a factor of 2. However, in other examples in which there are more layers, the PRS may be boosted by higher factors. For example, PRS mapped to REs in a certain layer may be boosted by corresponding REs in n other layers, resulting in a boosting factor of n.

Uplink Power Control

For UL PRS, the transmission power may be an important consideration since the hearability depends on the transmission power. Sounding Reference Signal (SRS) may be expected to be received by multiple Transmit-Receive Points (TRPs)/base stations (gNBs)/Location measurement unit (LMU) but the current power control scheme may be only based on the serving cell link quality. In this regard, a modified power control mechanism may be desirable. Accordingly, in certain examples of the present disclosure one or more of the following techniques may be applied for power control of UL PRS.

In some examples, UL PRS may be transmitted using the same or a similar mapping pattern as for DL PRS. For example, if SRS is used then comb-2 or comb-4 may be used.

Various techniques may be categorized as open loop power control or closed loop power control. For example, open loop power control may be based on measurements made at the UE, while closed loop power control may be controlled by the base station.

One or more of the following techniques may be used for open loop power control of positioning signals. The skilled person will appreciate that these techniques can be used as alternatives or in any suitable combination.

In one technique, a UE may measure the signal strength from multiple TRPs/gNBs. Here, the signal strength measurement may include any suitable measurement, for example path loss. Then, the UE may transmit PRS with a power determined based on the measurements. For example, the UE may identify the weakest link and transmit based on the weakest link. For example, assuming the link quality may be ranked in descending order for N TRP/gNBs as {L1, . . . , LN}, LN will be used for adjusting the UE transmission power. In another example, the UE may identify the average link quality and transmit based on the average link quality. For example, assuming the link quality may be ranked in descending order for N TRP/gNBs as {L1, . . . , LN}, $$\sum_{i=0}^{N} Li/N$$

will be used for adjusting the UE transmission power. In other examples, the PRS transmission power may be determined based on other factors derived from the signal strength measurements, or a combination of two or more factors (e.g. a weighted sum of the weakest link and the average link). In some examples, the UE may transmit PRS with a power determined in the manner described above as long as the power is lower than a maximum value, for example a maximum allowed transmit power per carrier (i.e. a threshold, which may be predetermined or dynamically configurable for example).

In another embodiment, the UE may measure the signal strength of the serving TRP/gNB. As above, the signal strength measurement may include any suitable measurement, for example path loss. Then, the UE may transmit PRS with a power determined based on the measurement. For example, the UE may transmit based on the measurement with a power offset added to its normal transmission power. In some examples, the offset may be a pre-defined offset. In other examples, the offset may be a configurable offset, for example configurable by upper layers.

In another embodiment, the UE may always transmit with full (or maximum) power, which could be subject to some constraints, e.g., the total transmission power of each symbol keeps the same.

One or more of the following embodiments may be used for closed loop power control of positioning signals. The skilled person will appreciate that these embodiments can be used as alternatives or in any suitable combination.

In a first embodiment, UL PRS can be indicated by gNB to ignore power control signaling and UE may always transmit with full/maximum power, which could be subject to some constraints, e.g., the total transmission power of each symbol keeps the same.

In another embodiment, an offset may be added to UL PRS for positioning such that the boosted power is equal to the sum of a normal/reference UL power and the offset. The normal/reference UL power may refer to the UL PRS transmission power based on a power control procedure of the related art, without applying the power control techniques disclosed herein. Whereas the DL normal/reference power may be constant, the UL normal/reference power may be determined by power control (e.g. a power control procedure of the related art) and thus may not be constant. The offset may be determined or selected according any suitable way. In some examples, the offset may be a pre-defined fixed offset. In other examples, the offset may be a configuration offset where the configuration is based on measurements of UL reference signals.

In another embodiment, the UE may be allowed to receive multiple Transmission Power Control (TPC) signals and adjust the transmission power based on the received TPC signals, for example based on the maximum power, the average power, etc. For example, the TPC may give the information how transmission power should be adjusted.

In another embodiment, boosting may be selectively applied according to a use of the PRS. For example, when UE receives TPC signals and identifies that the UL PRS will be mainly used for positioning (in some examples, since UL PRS can be SRS, PRS can also be used for channel sounding), the UE can scale the transmission power configured by the serving cell by K times. In certain examples, the transmission power may be boosted when UL PRS are used for positioning (or mainly used for positioning), whereas the transmission power is not boosted when UL PRS are not used for positioning (or not mainly used for positioning). The amount of boosting (e.g. a boosting factor K) may be determined based on the implementation.

For closed loop power control, multiple power control signaling can be issued from multiple cells. In some examples the UE may be allowed to receive multiple signaling from multiple cells. If such setting is not be feasible, these signaling can be conveyed to the serving cell via the x2 interface between gNBs and can be jointly signaled to the UE.

Figure 4:
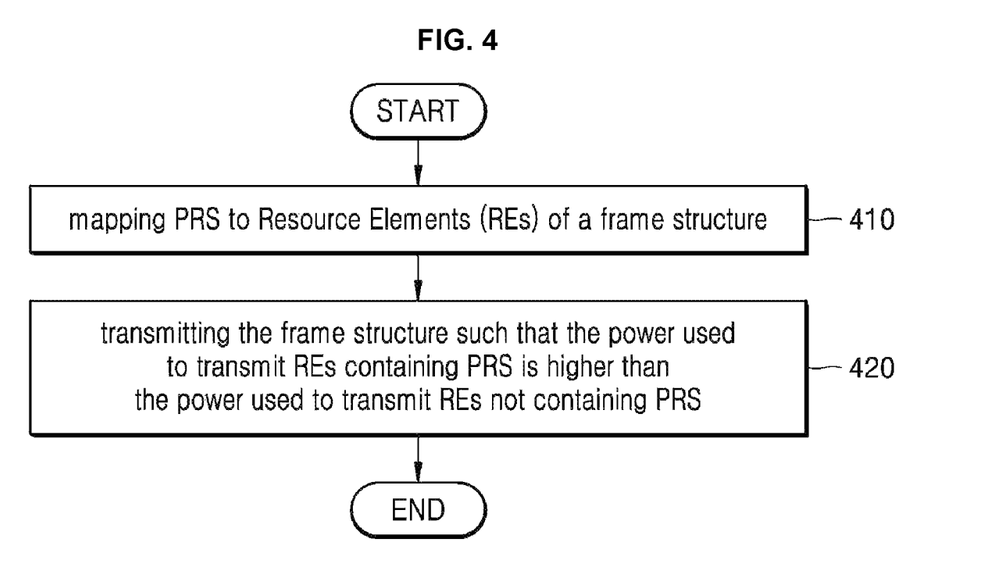
FIG. 4 illustrates a flowchart of a method for operation of a BS (base station) according to embodiments of the present disclosure.

FIG. 4 illustrates a flowchart of a method for operation of a BS (base station) according to embodiments of the present disclosure.

Referring to the FIG. 4, in operation 410, the BS may map RPS to Resource Elements (REs) of a frame structure. In addition, in operation 420, the BS may transmit the frame structure such that the power used to transmit REs containing PRS is higher than the power used to transmit REs not containing PRS. The frame structure may include two or more multi-carrier symbols and each RE comprises a sub-carrier of a symbol. When the BS maps map RPS to Resource Elements (REs) of a frame structure, the BS may map PRS to a subset of REs of each symbol such that the number of REs containing PRS is a fraction 1/k of the total number of REs in each symbol. The power used to transmit Res containing PRS may be a factor k higher than a reference power.

Figure 5:
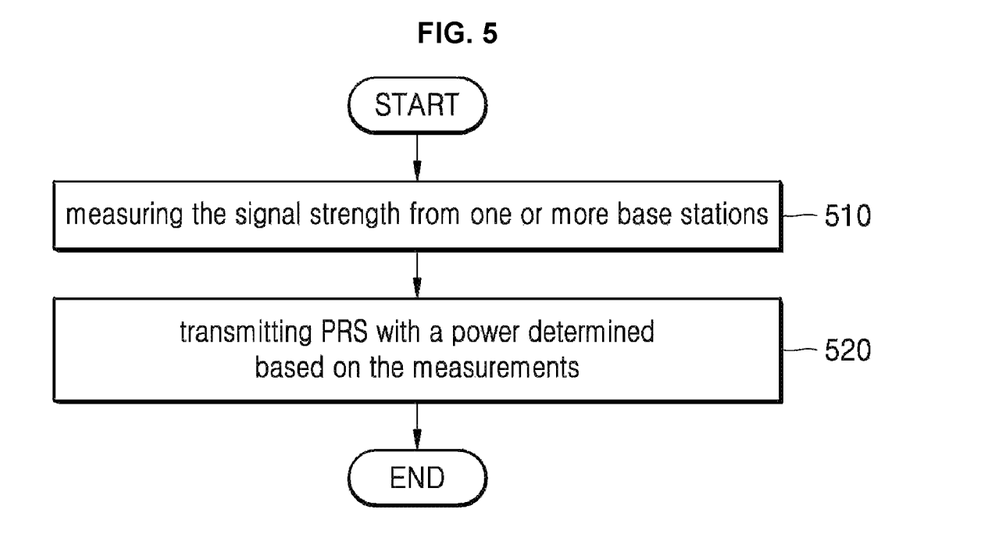
FIG. 5 illustrates a flowchart of a method for operation of a UE (user equipment) according to embodiments of the present disclosure.

FIG. 5 illustrates a flowchart of a method for operation of a UE (user equipment) according to embodiments of the present disclosure.

Referring to the FIG. 5, in operation 510, the UE may measure the signal strength from one or more base stations. In one embodiment, the UE may measure the signal strength from two or more base stations.

In one embodiment, in operation 520, the UE may transmit PRS with a power determined based on the measurements. In one embodiment, the UE may identify the weakest link and transmit the PRS based on the weakest link. In one another embodiment, the UE may identify the average link quality and transmit the PRS based on the average link quality.

In one another embodiment, the UE may receive signalling from a base station, and transmit PRS with a power determined based on the signalling.

Figure 6:
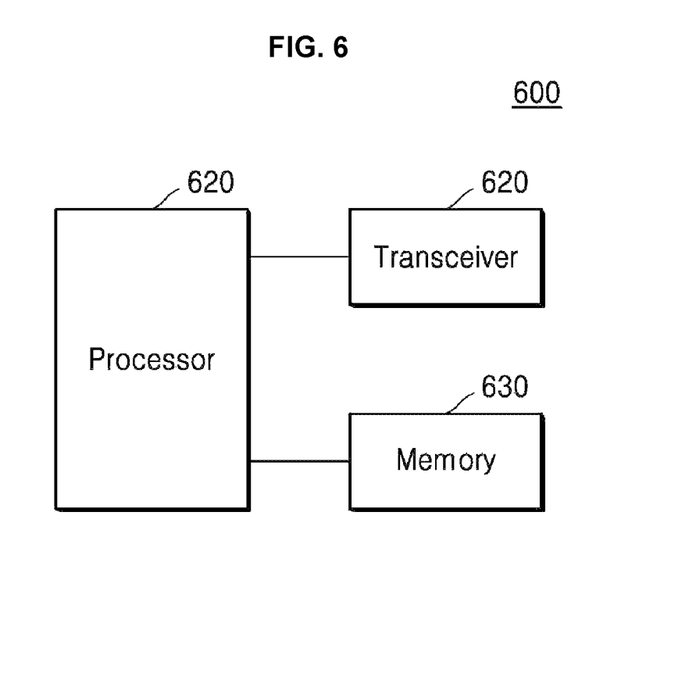
FIG. 6 illustrates a block diagram of a base station (BS) according to embodiments of the present disclosure.

FIG. 6 illustrates a block diagram of a base station (BS) according to embodiments of the present disclosure.

Referring to the FIG. 6, the BS 600 may include a processor 610, a transceiver 620 and a memory 630. However, all of the illustrated components are not essential. The BS 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the BS 600 may be implemented by the processor 610.

In one embodiment, the processor 610 may map PRS to Resource Elements (REs) of a frame structure and transmit the frame structure such that the power used to transmit REs containing PRS is higher than the power used to transmit REs not containing PRS.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 600 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the BS 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

Figure 7:
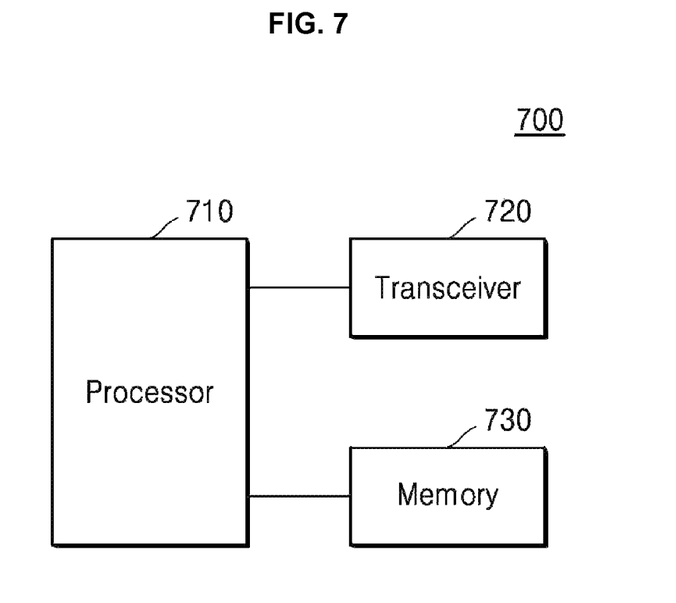
FIG. 7 illustrates a user equipment (UE) according to embodiments of the present disclosure.

FIG. 7 illustrates a user equipment (UE) according to embodiments of the present disclosure.

Referring to the FIG. 7, the UE 700 may include a processor 710, a transceiver 720 and a memory 730. However, all of the illustrated components are not essential. The UE 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the UE 700 may be implemented by the processor 710.

In one embodiment, the processor 710 may measure the signal strength from one or more base stations and transmit PRS with a power determined based on the measurements.

In one embodiment, the processor 710 may receive signaling from a base station and transmit PRS with a power determined based on the signaling.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the UE 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

Certain examples of the present disclosure may be provided in the form of a base station (e.g. gNB) and/or method therefore. Certain examples of the present disclosure may be provided in the form of a mobile device (e.g. UE) and/or method therefore. Certain examples of the present disclosure may be provided in the form of a system comprising one or more base stations and one or more mobile devices, and/or method therefore.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method step disclosed herein may be performed by a single entity (hardware and/or software), or the performance of such a process, operation and/or method step may be distributed and performed by two or more entities in cooperation. The skilled person will also appreciate that a single entity (hardware and/or software) may be configured to perform one process, operation and/or method step disclosed herein, or may be configured to perform two or more such processes, operations and/or method steps.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

The invention claimed is:

1. A method performed by a user equipment (UE) in a wireless communication system, the method comprising:
receiving configuration information for a sound reference signal (SRS), the configuration information including an offset;
receiving a downlink positioning reference signal (DL PRS) in a cell, wherein a comb value for the DL PRS includes 6;
identifying a downlink path loss for determining a transmission power of the SRS, based on the received DL PRS;
determining the transmission power of the SRS based on the offset and the identified downlink path loss; and
in case that the determined transmission power of the SRS is lower than a predetermined maximum transmission power, transmitting the SRS based on the determined transmission power of the SRS, wherein a comb value for the SRS includes 2 or 4.

2. The method of claim 1, further comprising:
in case that the determined transmission power of the SRS is equal to or greater than the predetermined maximum transmission power, transmitting the SRS based on the predetermined maximum transmission power.

3. The method of claim 1, wherein the offset is configured by a higher layer signalling.

4. The method of claim 1, wherein the SRS is used for positioning of the UE.

5. The method of claim 1, wherein the cell includes at least one of a serving cell or a non-serving cell.

6. A user equipment (UE) in a wireless communication system, the UE comprising:
a transceiver; and
at least one processor configured to:
receive, via the transceiver, configuration information for a sound reference signal (SRS), the configuration information including an offset,
receive, via the transceiver, a downlink positioning reference signal (DL PRS) in a cell, wherein a comb value for the DL PRS includes 6,
identify a downlink path loss for determining a transmission power of the SRS, based on the received DL PRS,
determine the transmission power of the SRS based on the offset and the identified downlink path loss, and
in case that the determined transmission power of the SRS is lower than a predetermined maximum transmission power, transmit, via the transceiver, the SRS based on the determined transmission power of the SRS, wherein a comb value for the SRS includes 2 or 4.

7. The UE of claim 6, wherein the at least one processor is further configured to:
in case that the determined transmission power of the SRS is equal to or greater than the predetermined maximum transmission power, transmit, via the transceiver, the SRS based on the predetermined maximum transmission power.

8. The UE of claim 6, wherein the offset is configured by a higher layer signalling.

9. The UE of claim 6, wherein the SRS is used for positioning of the UE.

10. The UE of claim 6, wherein the cell includes at least one of a serving cell or a non-serving cell.

* * * * *